United States Patent
Vechvittayakhlung

(10) Patent No.: US 10,210,356 B2
(45) Date of Patent: Feb. 19, 2019

(54) MULTI SIGNAL DIFFUSION INTEGRATED SYSTEM AND METHOD

(71) Applicant: Nippon Sysits Co. Ltd., Bangkok (TH)

(72) Inventor: Thamanoon Vechvittayakhlung, Bangkok (TH)

(73) Assignee: Nippon Sysits Co. Ltd., Bangkok (TH)

( * ) Notice: Subject to any disclaimer, the term of this patent is extended or adjusted under 35 U.S.C. 154(b) by 77 days.

(21) Appl. No.: 15/215,783

(22) Filed: Jul. 21, 2016

(65) Prior Publication Data

US 2018/0025190 A1 Jan. 25, 2018

(51) Int. Cl.
*G06K 7/10* (2006.01)
*H04W 4/80* (2018.01)
*G06K 19/07* (2006.01)

(52) U.S. Cl.
CPC ..... *G06K 7/10366* (2013.01); *G06K 7/10009* (2013.01); *G06K 19/0723* (2013.01); *H04W 4/80* (2018.02)

(58) Field of Classification Search
CPC ........ G06K 7/10366; G06K 19/07749; H04W 4/008; H04L 12/10
See application file for complete search history.

(56) References Cited

U.S. PATENT DOCUMENTS

| | | | |
|---|---|---|---|
| 2009/0192927 A1* | 7/2009 | Berg | G06Q 30/04 705/34 |
| 2011/0047188 A1* | 2/2011 | Martins | G06K 19/07749 707/803 |
| 2015/0120000 A1* | 4/2015 | Coffey | H04L 12/2803 700/13 |
| 2015/0168978 A1* | 6/2015 | Takizawa | G05F 1/66 347/110 |
| 2016/0044447 A1* | 2/2016 | Tetreault | G01K 1/024 455/41.1 |
| 2016/0092847 A1* | 3/2016 | Buchbinder | G06Q 10/20 705/26.8 |
| 2016/0127874 A1* | 5/2016 | Kingsmill | H04W 4/80 455/456.1 |
| 2016/0209899 A1* | 7/2016 | Brantner | H04L 12/12 |
| 2016/0261425 A1* | 9/2016 | Horton | G05B 15/02 |
| 2017/0104467 A1* | 4/2017 | Nikitin | H02J 50/10 |

* cited by examiner

*Primary Examiner* — Thomas D Alunkal

(74) *Attorney, Agent, or Firm* — Millen, White, Zelano & Branigan, P.C.; William Nixon

(57) ABSTRACT

An Internet of Things (IoT) enabled multi signal diffusion integrated system smartly tracks assets in different environments, using a combination of Radio Frequency Identification (RFID), Wi-Fi and Bluetooth Low Energy (BLE) technologies. The system includes an electrical plug embedded with one smart tracking device, or XenGraft. XenGraft has two different modes known as battery mode and non battery mode. XenGraft comprises different modules which are BLE module, RFID module and Power Sensor module. Each of these modules perform functions like finding asset locations, scanning for RFID signals, or tracking the current operational status of the assets. In non battery mode XenGraft communicates information towards a remote system server by a proprietary hop-by-hop communication architecture, via any local Wi-Fi network, or via any traditional cellular communication networks. In battery mode XenGraft communicates information towards the remote system server by a proprietary hop-by-hop communication architecture or via any local Wi-Fi network.

20 Claims, 7 Drawing Sheets

MULTI SIGNAL DIFFUSION INTEGRATED SYSTEM AND METHOD

FIELD OF THE INVENTION

Embodiments of the present invention, generally relate to an Internet of Things (IoT) enabled multi signal diffusion integrated system and method to smartly track assets in different environments, and in particular relate to a Internet of Things (IoT) enabled multi signal diffusion integrated system and a method to smartly track assets in different environments using a combination of Radio Frequency Identification (RFID), Wi-Fi and Bluetooth Low Energy (BLE) technologies.

BACKGROUND

Internet of Things (IoT) is a network of various completely different physical objects or "things" which are embedded with electronics, software, sensors, and network connectivity. Combination of electronics, software, sensors and network connectivity enables those objects to communicate with each other and share information. IoT devices are remotely controllable by using the existing network infrastructure which automatically assists IoT devices to directly integrate with physical world and computer based systems.

According to multiple survey reports prepared by separate eminent consulting companies, by 2020 nearly 26 billion devices are going to be connected on the Internet of Things. ABI Research estimates that more than 30 billion devices will be wirelessly connected to the IoT by 2020. As per Cisco, by 2022 the Internet of Things (IoT) market will touch a valuation of $14.4 trillion. IoT-related value-added services are forecasted to grow from $50 B in 2012 to $120 B in 2018. The worldwide revenue opportunity for IoT in manufacturing will grow from $472 B in 2014 to $913 B in 2018. Going by all these forecasts related to the massively growing market of Internet of Things (IoT) it is evident in next 20 years the amount of value Internet of Things (IoT) will add in common peoples' lives are beyond our wildest imagination.

Bluetooth Low Energy (BLE) also known as Bluetooth Smart or Version 4.0+ of the original Bluetooth specifications is a power and application friendly version of Bluetooth build specifically for the Internet of Things (IoT) devices. BLE which was designed and marketed by the Bluetooth Special Interest Group (SIG), has seen considerable usages in different applications suitable for healthcare, fitness, retail, beacons, security, home entertainment etc. Due to its massive applications in Internet of Things (IoT) devices, BLE reduces power consumption and cost to a greater extent while maintaining a similar communication range. Bluetooth Smart was originally introduced under the name Wibree by Nokia™ in 2006, but was merged into the main Bluetooth standard in 2010 with the adoption of the Bluetooth Core Specification Version 4.0. Each and every mobile operating system like iOS™, Android™, Windows™ offer native support for Bluetooth Smart. Bluetooth SIG predicts that by 2018 over 90 percent of Bluetooth-enabled smart devices will support Bluetooth Smart.

Asset tracking is basically detecting, identifying, and pursuing of physical assets in different environments. Assets can be tracked for various reasons like they can be tracked while moving from one geographical location to another geographical location. Simultaneously they can also be tracked while being kept in one single environment regarding their various usages. As per the current state of the art, the most common approaches associated with asset tracking are: Global Positioning Satellite (GPS) based asset tracking, RFID based asset tracking, Wi-Fi based asset tracking and BLE/iBeacon based asset tracking.

Global Positioning Satellite (GPS) based asset tracking is performed by attaching GPS trackers with moving objects and then pursuing those trackers with the help of GPS to determine and track their precise locations. The recorded location data can either be stored within the tracking unit, or it may be transmitted to a central location data base, or Internet-connected computer, using a cellular (GPRS or SMS), radio, or satellite modem embedded in the unit. This allows the asset's location to be displayed against a map backdrop either in real time or when analysing the track later, using GPS tracking software. Data tracking software is available for smart-phones with GPS capability. However GPS based asset tracking is still not error free. One of the major issues which still bug GPS based asset tracking is that in indoor environments they are not very accurate outside of 5-15 m movement range. GPS trackers fail to detect floors in indoor environments. Another major issue which GPS trackers face in indoor environments is interference problems. Radio signal emissions from nearby bands, signal jamming due to roof, walls, weather all create enormous hindrances in achieving a smooth user experience while tracking assets in indoor environments using GPS trackers.

Radio-Frequency Identification (RFID) technology which is operational from the 1980's applies electromagnetic fields to automatically identify and track objects with which RFID tags are attached to. The RFID tags stores information which is electronically stored. RFID tags can either be active or passive. Active RFID tags contain local power sources such batteries and may operate at hundreds of meters from the RFID reader. Like barcodes, the Active RFID tags do not need to be within the line of sight of the reader, so it may be embedded in the tracked object. The Passive RFID tags do not have any batteries inside them. Instead they collect energy from any nearby RFID reader's interrogating radio waves. However RFID based asset tracking do come with their share of technical problems.

As RFID systems use electromagnetic fields to communicate they are relatively easy to get jammed and/or disrupted using energy at the right frequency. Though in shopping malls it will create a little inconvenience for the customers but this same situation will be disastrous in other environments where RFID is increasingly used, like hospitals or in the military in the field. A single global standardization for RFID technology still does not exist in the world. For example UHF RFID currently used in USA is not incompatible with those of Europe or Japan. Also in indoor environments RFID based asset tracking systems does not provide accurate ranges.

Since 1999, Wi-Fi or WiFi technology allows electronic devices to connect to a Wireless Local Area Network (WLAN), mainly using the 2.4 GHz (12 cm) UHF and 5 GHz (6 cm) SHF ISM radio bands. Wi-Fi can share a new ID parameter: the SSID (Service Set Identifier) which is the name of the network and the Medium Access Control (MAC) address of the Access Points (APs). The biggest problem related to WiFi technology is that it possesses huge security concerns regarding keeping data safe of users. The most common wireless encryption standard Wired Equivalent Privacy (WEP) is easily breakable even when properly configured. Though considerable advances do have taken place in terms of security but the vulnerabilities still exists. Same like the GPS based asset tracking and RFID based asset tracking systems, WiFi based asset tracking is also not very accurate in indoor environments. Particularly the coverage area of any WiFi is always limited. So once an asset is out of the coverage area of any WiFi network, there is no way one can track that asset again.

Wi-Fi has also been used to improve real time location systems, such as "Active RFID over the Wi-Fi™" using the existing 802.11 Wi-Fi networks and its signal strength readings to calculate a number of probable locations on a virtual map, comparing tag readings against a stored database of Wi-Fi readings or Received Signal Strength Indicators (RSSI). But the problem with this system is that it is very difficult to implement and maintain like over volume of mobile tags, sensors, badges etc. Also there is a need to charge the batteries for wireless devices at specific time intervals. Further to maintain the equipments human involvement is must.

iBeacon is a protocol developed by Apple™ which uses Bluetooth Low Energy (BLE) technology particularly suitable for low energy consumable Internet of Things (IoT) devices. BLE was launched in 2010, and consists to collect 3 main information (UUID, Major and Minor) that improved the real time location system field. With BLE or iBeacon system, it's possible to know the location, ID Data and more information from the physical assets and around it (humidity, temperature, motion, power consumption, automation). The data can then be send to a smartphone via BLE (or Bluetooth 4.0 available for iPhone™ 4S, 5, 6 . . . and Android 4.3). However the Bluetooth Smart based iBeacon do have its own range of issues like low data transfer rate (58 Kbps), signal lost over long distance (signal reception quality goes down over 10 meters). Furthermore tags, badges, sensors are mobile which increase the risk of losing those things.

Thus, there is a need for an Internet of Things (IoT) enabled multi signal diffusion integrated system and a method to smartly track assets in different environments using a combination of Radio Frequency Identification (RFID), Wi-Fi and Bluetooth Low Energy (BLE) technologies.

SUMMARY

The invention is discussed in reference to a smart asset tracking device embedded electrical plug for exemplary purposes only. It is contemplated that the smart asset tracking device may equally be embedded with any electrical devices that can be plugged into electrical sockets. Furthermore this invention is discussed in reference to a medical environment like a hospital, a clinic and so on. It is further contemplated that this invention may also be equally applicable in manufacturing industry, in media industry where asset tracking holds a very crucial importance for better management purposes.

Embodiments in accordance with the present invention provide an Internet of Things (IoT) enabled multi signal diffusion integrated asset tracking system. The system includes an electrical plug embedded with one smart tracking device called as XenGraft. The system further includes a medical instrument which is physically connected via an electrical cable with the electrical plug wherein the electrical plug is inserted into a RFID tag attached electrical socket. In one embodiment when the medical instrument is operational and it is plugged into the electrical plug which is inserted inside the RFID tag attached electrical socket, XenGraft functions by consuming power directly from electrical power lines. In a separate embodiment when the medical instrument is non operational XenGraft functions by consuming power from its own rechargeable batteries. The system further includes one remote system server with which the XenGraft communicates wirelessly using at least a proprietary hop-by-hop network or a local Wi-Fi network or a traditional cellular communication network (2G/3G/4G).

The XenGraft architecture includes a power supply, a battery, a Central Processing Unit (CPU), a BLE module, a RFID module, a Sensor module, a Display screen, a mobile simcard slot, a Wi-Fi antenna and a Mobile antenna.

The power supply helps XenGraft to consume power directly from the power lines when the medical instrument is operational and the medical instrument is connected with the XenGraft embedded electrical plug where the electrical plug is inserted inside the RFID tag attached electrical socket. The battery helps XenGraft to consume power when the XenGraft embedded electrical plug is connected to a non-operational medical instrument. The CPU is the main element of the XenGraft architecture which makes the XenGraft function based on a plurality of instructions. The display screen shows different information available to XenGraft. The Wi-Fi antenna helps the XenGraft to communicate with remote system server when there is a local Wi-Fi network present. The mobile antenna helps XenGraft to communicate with the remote system server using traditional cellular communication networks (2G/3G/4G).

The XenGraft CPU transmits a plurality of instructions towards the BLE module, the RFID module and the Sensor module. These three modules based on the received instructions fetches a plurality of different information and report them back to the CPU.

The BLE module generates Beacon signals at a repeated time intervals to provide identity to the medical instrument connected with the XenGraft. The Beacon signals emitted by the BLE module carries one Internet Protocol (IP) address which has already been pre-assigned to the XenGraft. When the medical instrument is physically plugged into the electric plug embedded with XenGraft, the IP address associated with the XenGraft becomes the identity of the medical instrument which is plugged into that electric plug. This helps the remote system server to particularly identify every individual medical instruments connected to every individual XenGraft embedded electric plugs.

The RFID module by working as a RFID reader scans the environment to look for any RFID signals to determine the exact location (socket no, floor no., room no.) of the RFID tag embedded electrical socket and reports the information back to the CPU. Based on this received information the RFID module determines what the exact geographical location of the medical instrument is. All these location related information is stored in the RFID tag attached with the electrical socket to which the XenGraft embedded electrical plug is connected.

The Sensor module is capable to sense a plurality of information such as power, temperature, humidity, motion and so on. In an embodiment if the sensor module is sensing power, then the sensor module determines if the medical instrument is switched on/switched off/charging/stand by. XenGraft is capable to collect all this information in realtime and forwards them towards the remote system server. The remote system server after receiving all the information assigns priority in use and schedules the assets according to the charging status.

In the embodiment when the XenGraft function using its own battery, the battery simultaneously powers up the XenGraft CPU so that the CPU can also function as a relay node. Due to that in battery mode XenGraft remains functional up to 20 days and after every 20 days it needs to be recharged. Once all the information are collected XenGraft forwards those accumulated information towards the remote system server which generates accurate billing information associated with the medical instrument which may have been used by any patient during their stay in the hospital.

To transmit information towards the remote system server, XenGraft initially looks for any local Wi-Fi network. If there is no local Wi-Fi network present, XenGraft transmits information towards the remote system server by using their proprietary architecture which is a hop-by-hop manner similar to mesh networking fashion. To transmit information in this hop-by-hop manner, XenGraft CPU functions as a relay node where it relays all the collected information towards it next immediate neighbour which is one separate XenGraft. That immediate neighbour then relays the received information towards its next immediate neighbour. In this fashion the collected information reaches the remote system server in a hop-by-hop fashion. Now during this technique of transmitting information, if one XenGraft detects any local Wi-Fi network, then it automatically stops the proprietary hop-by-hop transmission technique and accesses the local Wi-Fi network to reach the remote system server.

If XenGraft detects any local Wi-Fi network present in accessible distance, XenGraft transmits all information towards the remote system server by accessing the locally present Wi-Fi network using the Wi-Fi antenna embedded in its architecture.

If XenGraft fails to transmit information in either of the above two disclosed procedures while the XenGraft is accessing power directly from the power lines, only in that situation XenGraft activates its cellular interface and transmits information towards the remote system server by accessing any of the traditional cellular networks (2G/3G/4G).

Embodiments in accordance with the present invention provide an Internet of Things (IoT) enabled multi signal diffusion integrated asset tracking method. A medical instrument is inserted into a XenGraft embedded electrical plug. The XenGraft embedded electrical plug is plugged into a RFID tag attached electrical socket. The electrical socket includes one RFID tag. In this embodiment the medical instrument is operational. Hence in this situation the XenGraft is consuming power directly from the power lines through the electrical socket. In this situation XenGraft CPU receives power from the power lines to act as a relay node as per need arises.

In this embodiment the XenGraft CPU sends a plurality of commands to the BLE module, the RFID module, and the Sensor module. The BLE module provides the IP address of the XenGraft, which basically becomes the identity of the medical instrument connected to the XenGraft embedded electrical plug. The RFID module provides the exact geo-location of the medical instrument by fetching all those information from the RFID tag attached with the electrical socket to which the medical instrument is plugged into. The Sensor module senses different information like power, temperature, humidity, motion and so on and provides the relevant information back to the XenGraft CPU. Finally the CPU receives all the necessary information coming from all the three modules and forwards them towards the remote system server.

To transmit information towards the remote system server, XenGraft initially looks for any local Wi-Fi network. If there is no local Wi-Fi network present, then XenGraft transmits information towards the remote system server by accessing their proprietary architecture which is a hop-by-hop manner similar to mesh networking fashion. To transmit information in this hop-by-hop manner, XenGraft CPU functions as a relay node and relays all the collected information towards it next immediate neighbour which is one separate XenGraft. That immediate neighbour then relays the received information towards its next immediate neighbour. In this fashion the collected information reaches the remote system server in a hop-by-hop fashion. Now during this technique of transmitting information, if one XenGraft detects any local Wi-Fi network, then it automatically stops the proprietary hop-by-hop transmission technique and accesses the local Wi-Fi network to reach the remote system server.

If XenGraft detects any local Wi-Fi network present in accessible distance, XenGraft transmits all information towards the remote system server by accessing the locally present Wi-Fi network using the Wi-Fi antenna embedded in its architecture.

In any case if XenGraft fails to transmit information towards the remote system by neither of the above disclosed procedures, only then XenGraft activates its cellular interface and transmits all the information towards the remote system server by accessing any traditional cellular communication networks (2G/3G/4G).

Embodiments in accordance with the present invention further provide an Internet of Things (IoT) enabled multi signal diffusion integrated asset tracking method. A medical instrument is inserted into a XenGraft embedded electrical plug. The XenGraft embedded electrical plug is inserted into a RFID tag attached electrical socket. In this embodiment the medical instrument is not operational. Hence in this situation the XenGraft gets powered up and becomes operational entirely using its own rechargeable batteries. The rechargeable batteries also powers up the XenGraft CPU to work as a relay node in certain circumstances.

In this embodiment as the medical instrument is not operational, hence there is no need for the XenGraft CPU to send a plurality of commands to either the RFID module or the Sensor module. Instead the CPU of XenGraft sends commands to just the BLE module. Based on the received instructions from the CPU, the BLE module emits multiple beacon signals. This beacon signals carries one Internet Protocol (IP) address pre-assigned to the XenGraft. Every individual XenGraft is identified by its own IP address. When the medical instrument gets plugged into any XenGraft embedded electrical plug, the IP address of the XenGraft basically becomes the identity of the medical instrument which is connected to the XenGraft embedded electric plug. Finally the CPU receives the necessary identity information about the medical instrument from the BLE module and forwards the information towards the remote system server.

To transmit information towards the remote system server, XenGraft initially looks for any local Wi-Fi network. In same fashion discloses above, if XenGraft detects there is no local Wi-Fi network present, XenGraft transmits information towards the remote system server by accessing their proprietary architecture which is a hop-by-hop manner similar to mesh networking fashion. To transmit information in this hop-by-hop manner, XenGraft CPU functions as a relay node where it relays all the collected information towards it next immediate neighbour which is one separate XenGraft. That immediate neighbour then relays the received information towards its next immediate neighbour. In this fashion the collected information reaches the remote system server in a hop-by-hop fashion. Now during this technique of transmitting information, if one XenGraft detects any local Wi-Fi network, then it automatically stops the proprietary hop-by-hop transmission technique and accesses the local Wi-Fi network to reach the remote system server.

If XenGraft detects any local Wi-Fi network present in accessible distance, XenGraft transmits all information towards the remote system server by accessing the locally present Wi-Fi network using the Wi-Fi antenna embedded in its architecture.

Advantages of the system will be apparent from the present application of the embodiments described herein.

The preceding is a simplified summary to provide an understanding of some aspects of embodiments of the present invention. This summary is neither an extensive nor exhaustive overview of the present invention and its various embodiments. The summary presents selected concepts of the embodiments of the present invention in a simplified form as an introduction to the more detailed description presented below. Other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

Figure 1:
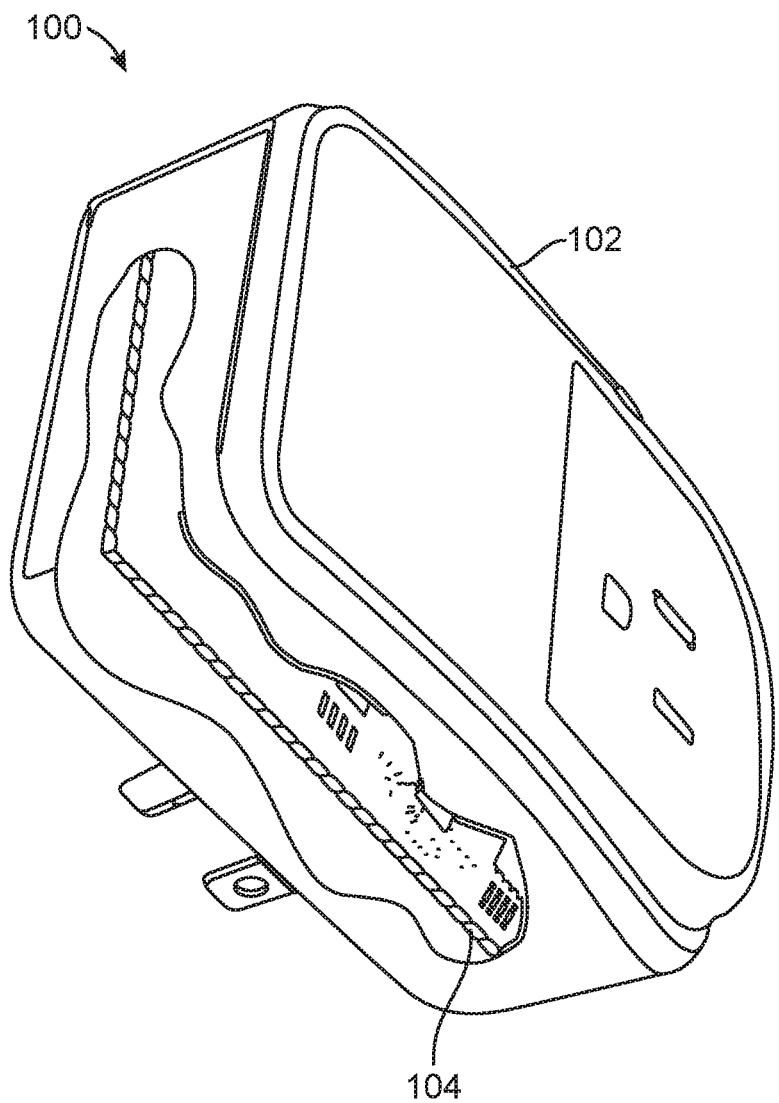
FIG. 1 depicts an illustrative representation of an IoT enabled electric plug embedded with a circuit board, according to an embodiment of the present invention.

The headings used herein are for organizational purposes only and are not meant to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, reference numerals have been used, where possible, to designate like elements common to the figures.

DETAILED DESCRIPTION

Embodiments of the present invention will be illustrated below in conjunction with FIG. 1.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "computer-readable medium" as used herein refers to any tangible storage and/or transmission medium that participates in storing and/or providing instructions to a processor for execution. Such a medium may take many forms, including but not limited to non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

FIG. 1 depicts an illustrative representation 100 of an IoT enabled electric plug embedded with a circuit board. The IoT enabled electric plug 102 comprises of a circuit board 104 embedded inside. The circuit board 104 provides multiple capabilities to the IoT enabled electric plug 102 to be remotely controlled and accessed.

Figure 2:
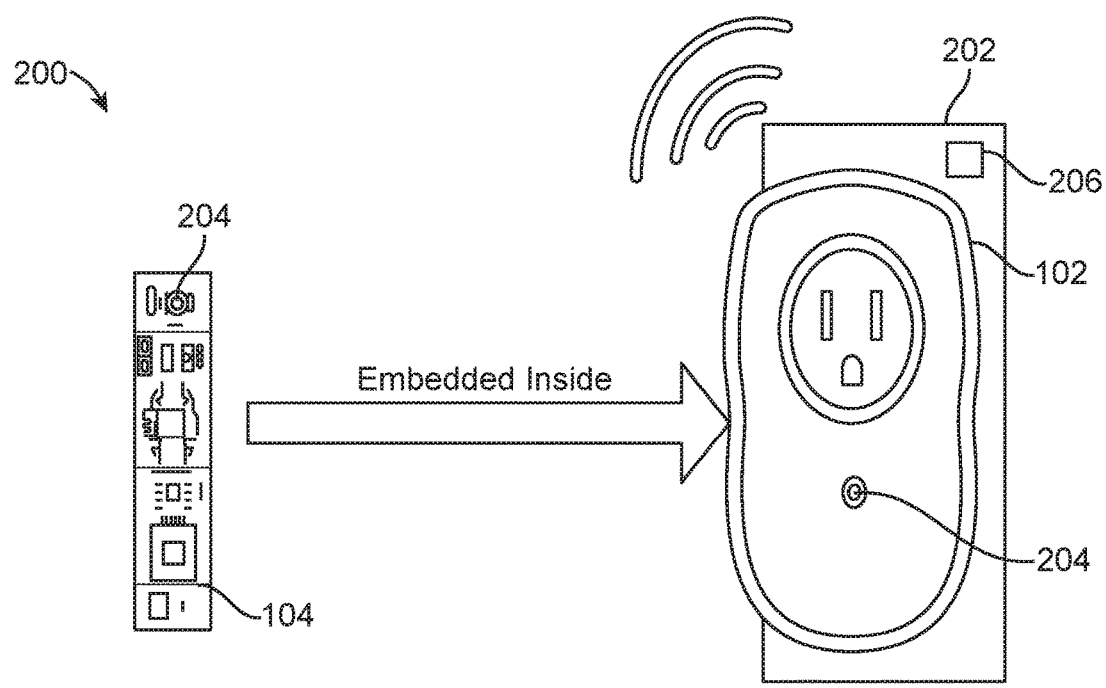
FIG. 2 depicts an illustrative representation of a XenGraft being incorporated on a circuit board implemented inside an IoT enabled electric plug.

FIG. 2 depicts an illustrative representation 200 of XenGraft being incorporated on a circuit board implemented inside an IoT enabled electric plug.

FIG. 2 depicts the IoT enabled electric plug 102 embedded with the circuit board 104 is plugged into an electric socket 202. The electric circuit board 104 is embedded with XenGraft 204. XenGraft 204 provides capabilities to the IoT enabled electric plug 102 to be remotely controlled and accessed. The electric socket 202 comprises one RFID tag 206.

In one embodiment when a medical instrument is operational and the medical instrument is inserted into the electric plug 102 which is plugged into the electric socket 202, the XenGraft 204 embedded inside the electric plug 102 consumes power directly from the electrical power lines.

In a separate embodiment if the medical instrument is not operational, in that situation the XenGraft 204 embedded inside the electric plug 102 does not consume any power from the electrical power lines via the electrical socket 202. In such situation the XenGraft 204 functions using its own rechargeable batteries.

Irrespective of the above two disclosed embodiments, when XenGraft 204 needs to transmit information from the IoT enabled electrical plug 102 to any remote system server, initially XenGraft 204 looks for any locally present Wi-Fi network. If there is no local Wi-Fi network present, XenGraft 204 CPU functions as a relay node and forwards the information using their proprietary architecture in a hop-by-hop manner towards the remote system server. This hop-by-hop transmission technique proposed in this invention is based on mesh networking based approach when one XenGraft relays the information towards the very next XenGraft and then the very next XenGraft relays that information to its immediate neighbour. If during this information sending techniques, if the XenGraft 204 suddenly detects any Wi-Fi network, then the XenGraft 204 switches of the proprietary hop-by-hop transmission techniques and starts to access the Wi-Fi network.

If XenGraft 204 detects any locally present Wi-Fi network, then XenGraft 204 transmits all the information towards the remote system server by accessing that locally present Wi-Fi network by using its Wi-Fi antenna.

When XenGraft 204 is functional by accessing power directly from the active power lines, in that situation if XenGraft 204 fails to transmits information towards the remote system by either of the two disclosed procedures, only then XenGraft 204 activates its cellular interface, access any traditional cellular communications networks (2G/3G/4G) and transmits all the information towards the remote system server.

Figure 3:
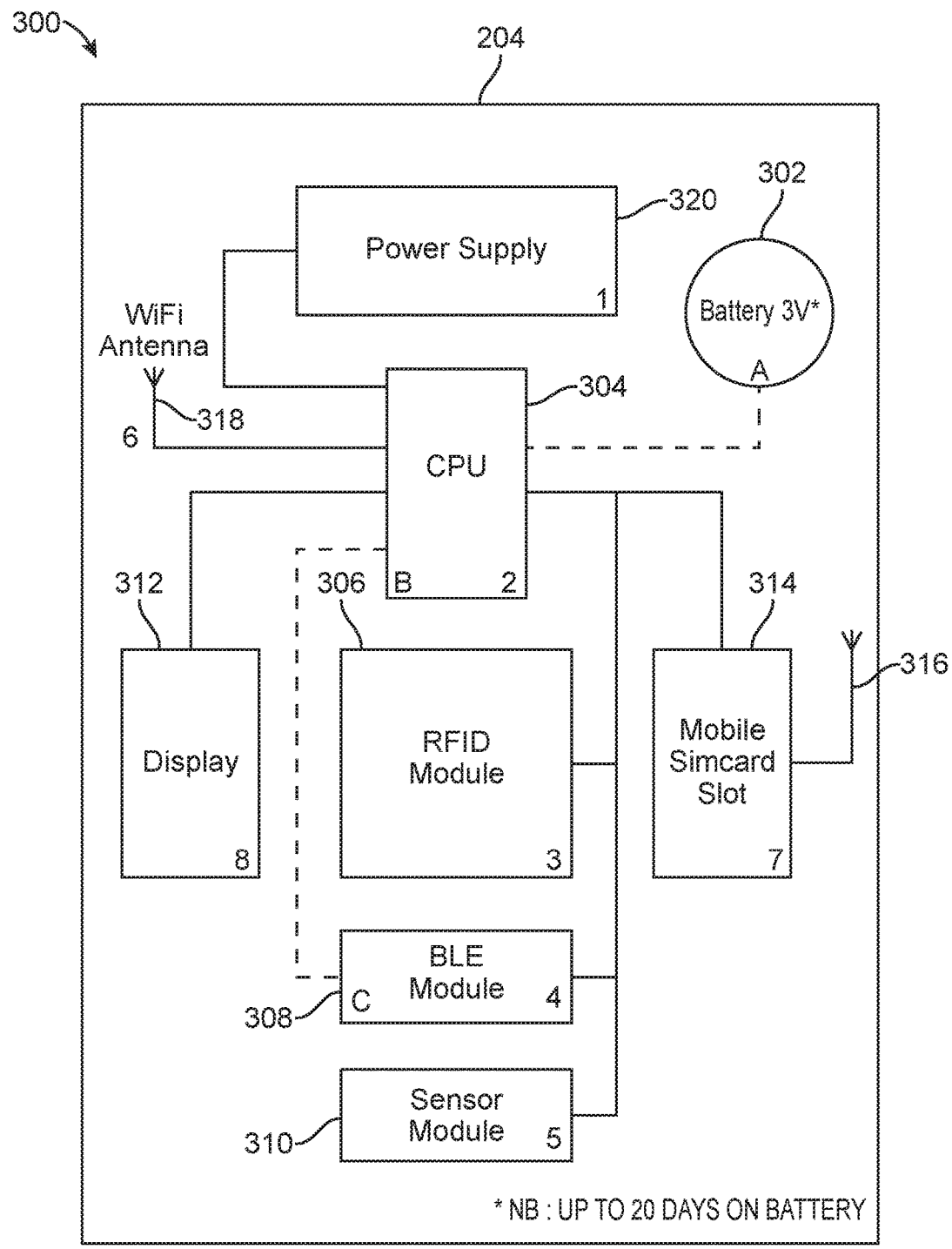
FIG. 3 depicts an illustrative representation of a XenGraft internal architecture.

FIG. 3 depicts an illustrative representation 300 of XenGraft internal architecture XenGraft 204 comprises of a rechargeable battery 302, a Central Processing Unit (CPU) 304, a RFID module 306, a BLE module 308, a Sensor module 310, a display 312, a mobile simcard slot 314, a mobile antenna 316, a Wi-Fi antenna 318 and a power supply 320.

In an embodiment when an operational medical instrument is connected to the IoT enabled electrical plug 102 which is inserted inside the electrical socket 202, and the electrical power lines are active, XenGraft 204 consumes power directly from the electrical power lines using the power supply 320.

In a separate embodiment when the medical instrument is not operational and it is connected with the IoT enabled electrical plug 102 which is inserted inside the electrical socket 202, XenGraft 204 functions by consuming power from the rechargeable battery 302. In both the embodiments, the electrical socket 202 is enabled with a RFID tag 206.

In the embodiment when the medical instrument is operational and electrical power lines are active, the XenGraft 204 receives power directly from the electrical power lines, where the XenGraft 204 embedded electrical plug 102 is connected with the electrical socket 202. In such situation the CPU 304 sends multiple commands simultaneously towards the RFID module 306, the BLE module 308 and the Sensor module 310. Based on the received instructions these three modules starts operating simultaneously.

The BLE module 308 after receiving the instructions from the CPU 304, starts to emit beacon signals comprising a Universal Unique ID (UUID) at repeated time intervals. In an embodiment this UUID can be an Internet Protocol (IP) address pre-assigned with the XenGraft 204. The XenGraft 204 comprises a particular UUID and/or IP address. This UUID and/or IP address becomes an identity for the medical instrument connected to the XenGraft 204 located inside the electrical plug 102 inserted inside the electrical socket 202. To describe this feature with an example let us assume that the BLE module 308 located inside XenGraft 204 has the UUID #07. Based on this assigned UUID by the BLE module 308, which ever medical instrument gets connected with the electrical plug 102 inserted inside the electrical socket 202 receives UUID #07 which authenticates the identity of the medical instrument.

The RFID module 306 based on the received instructions from the CPU 304 starts to scan the environment to look for any RFID signals where the RFID module 306 works as a RFID reader. The electrical socket 202 includes the RFID tag 206 which works as a RFID transmitter. The RFID tag 206 emits RFID signals which include multiple information (socket no, floor no., room no.) associated with the electrical socket 202. The location of the medical instrument is determined based on these received information coming out of the RFID tag 206 attached with the electrical socket 202. To describe this feature with an example let us assume that the electrical socket 202 is Socket No. 5, located at 5th floor, Room No. 2. All these information is already pre-loaded in the RFID tag 206. When the XenGraft 204 embedded electrical plug 102 is inserted inside the electrical socket 202, the RFID module 306 starts to pick up the RFID signals coming out from the RFID tag 206 attached with the electrical socket 202. Based on the received RFID signals, the RFID module 306 determines that the particular medical instrument is connected with Socket No. 5, of 5th Floor Room No 2. This operational step is absolutely necessary to properly identify the exact locations of any kinds of assets for their proper management functionalities.

The Sensor module 310 based on the received instructions coming from the CPU 304 starts to sense different kinds of information. The sensor module 310 is capable to sense at least power, temperature, movement, humidity and so on. In this embodiment if the sensor module 310 is sensing power, then the sensor module senses if the medical instrument is switched on/switched off/charging/stand by. To describe this feature with an example, as in this embodiment the medical instrument is operational and it is connected with the XenGraft 204 embedded electrical plug 102 inserted inside the electrical socket 202, sensor module 310 collects this information and reports it back towards the CPU 304.

In this embodiment, the XenGraft 204 CPU 304 receives from the RFID module 306, the BLE module 308, and the Sensor module 310 a plurality of different information. To describe the information received, let us assume that the CPU 304 receives information like the medical instrument has UUID #07, and it is connected to the electrical socket 202 which is Socket No. 5, of 5th Floor, Room No 2.

Now to transmit this information towards the remote system server, the XenGraft 204 tries to detect if there is any local Wi-Fi network present in accessible distance. If there is no such Wi-Fi network present in accessible distance, the CPU 304 of XenGraft 204 functions as a relay node and transmits this information towards its next immediate neighbour in one single hop. That immediate neighbour of the XenGraft 204 after receiving the information relays the received information in one single hop towards its next immediate neighbour. In this fashion, information from the XenGraft 204 CPU 304 reaches the remote system server. This hop-by-hop architecture is based on mesh networking architecture. If during this information sending techniques, if the XenGraft 204 suddenly detects any Wi-Fi network, then the XenGraft 204 switches of the proprietary hop-by-hop transmission techniques and starts to access the Wi-Fi network.

If XenGraft 204 detects any local Wi-Fi network, the CPU 304 of XenGraft 204 transmits the information towards the remote system server by accessing the local Wi-Fi network using the Wi-Fi antenna 318 present in its architecture. If in any case XenGraft 204 fails to transmit all the information towards the remote system server by neither of the above disclosed procedure, only then the XenGraft 204 activates the mobile simcard slot 314 and transmits all the information towards the remote system server by accessing any present traditional cellular communication network (2G/3G/4G) using the mobile antenna 316.

In the separate embodiment when the medical instrument is not operational, the XenGraft 204 functions using the power stored in the rechargeable battery 302. In this embodiment as because only the BLE module 308 remains operational, the battery 302 provides power only to the BLE module 308. The battery 302 also simultaneously provides power to the CPU 304 of the XenGraft 204, so that the CPU 304 functions as a relay node in case need arises. Due to that the rechargeable battery 302 of XenGraft 204 functions up to 20 days and after every 20 days the rechargeable battery 302 needs to be charged appropriately. As the medical instrument is not operational, hence XenGraft 204 neither needs any information from the RFID module 306 nor from the Sensor module 310.

Post receiving instructions from the CPU 304, the BLE module 308 responds back at least with the UUID and/or IP address of the XenGraft 204 which basically functions as an identity of the medical instrument connected to the XenGraft 204 located inside the electrical plug 102 which is inserted inside the electrical socket 202.

In similar manner disclosed above the XenGraft 204 initially tries to detect if there is any local Wi-Fi network present in accessible distance. If there is no such Wi-Fi network present in accessible distance, the CPU 304 of XenGraft 204 functions as a relay node and transmits this information towards its next immediate neighbour in one single hop. That immediate neighbour of XenGraft 204 after receiving the information relays the received information in one single hop towards its next immediate neighbour. In this fashion, information from XenGraft 204 CPU 304 reaches the remote system server. This hop-by-hop architecture is based on mesh networking architecture.

If XenGraft 204 detects any local Wi-Fi network, the CPU 304 of XenGraft 204 transmits the information towards the remote system server by accessing the local Wi-Fi network using the Wi-Fi antenna 318 present in its architecture.

Figure 4:
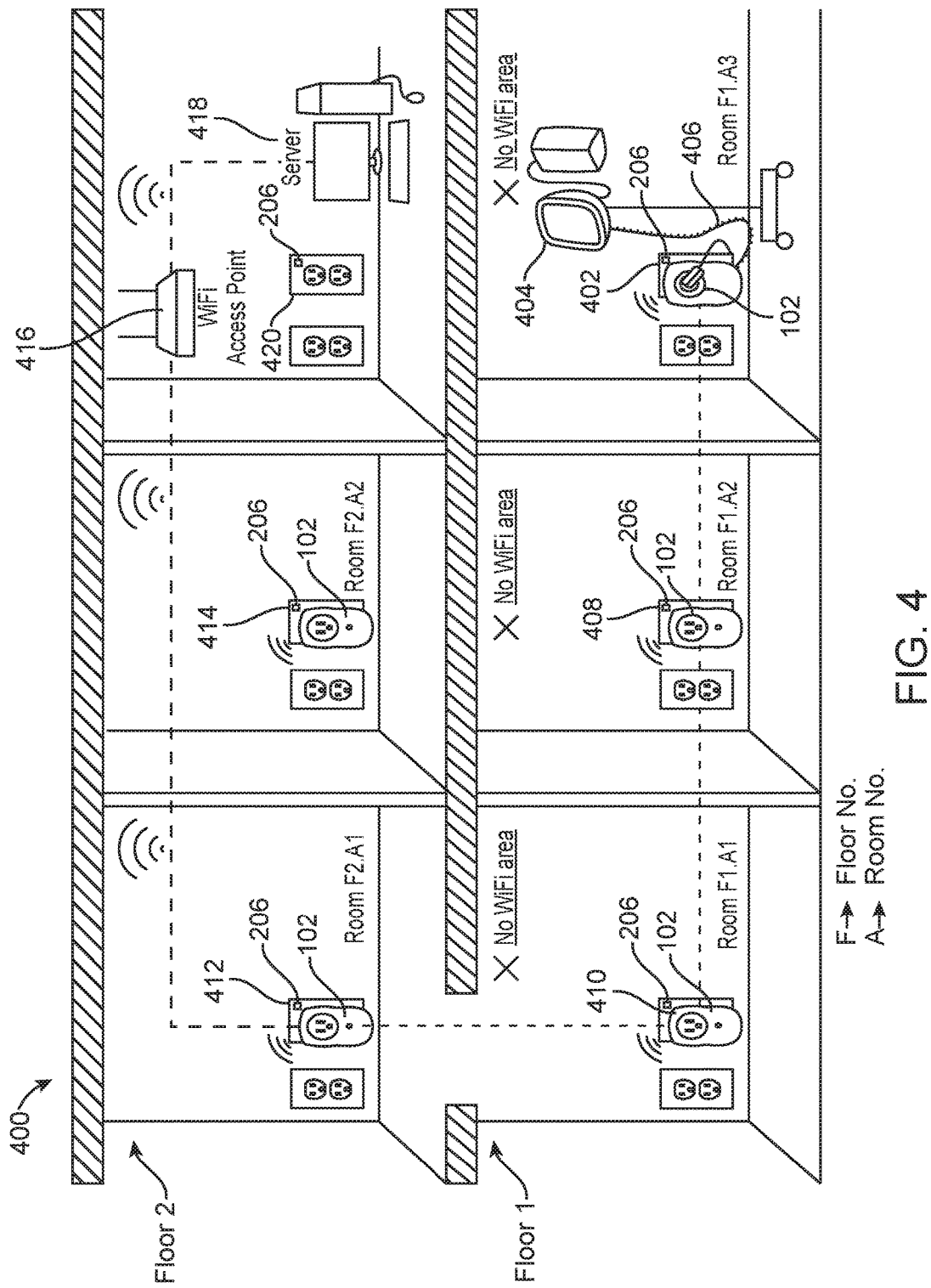
FIG. 4 depicts a representation 400 of a possible operational scenario where multiple electrical plugs embedded with individual XenGraft are forwarding information in one single direction towards a remote system server in a hop by hop fashion accessing their own Wi-Fi network along with any locally present Wi-Fi network.

FIG. 4 depicts a representation 400 of a possible operational scenario where multiple electrical plugs embedded with individual XenGraft are forwarding information in one single direction towards a remote system server.

In room A3 situated in First Floor, a XenGraft embedded electrical plug 102 is inserted into an electrical socket 402. A medical instrument 404 is connected with the XenGraft embedded electrical plug 102 which is inserted inside the electrical socket 402.

The electrical socket 402 includes a RFID tag 206. It may also be noted that the rest electrical sockets 408, 410, 412, 414 and 420 consists of the same kind of the RFID tag 206. It may also be noted that all the electrical plugs located in both the floors are all the same kind of plugs equivalent to the electrical plug 102. It may further be noted that the entire Floor 1 (F1) does not have any local working Wi-Fi connection. The electrical plug 102 is physically connected via an electrical cable 406 with a medical instrument 404.

The XenGraft embedded inside the electrical plug 102 collects all the related information from the medical instrument 404 as described above in FIG. 3 description. As there is no local Wi-Fi network present in the entire Floor 1 (F1), the XenGraft CPU starts to function as a relay node. The XenGraft CPU by functioning as the relay node relays the collected information from the medical instrument 404 towards its next immediate neighbour using a hop-by-hop approach. This hop-by-hop approach is based on a mesh networking based approach.

To explain this situation in details with reference to FIG. 4, the XenGraft embedded electrical plug 102 forwards information from room A3 towards its next immediate neighbour situated in the next room A2 in one single hop. One separate XenGraft embedded electrical plug 102 is present in the next room A2 which is inserted inside an electrical socket 408. Post receiving the information from the electrical plug 102 of room A3 in one single hop, the XenGraft embedded electrical plug 102 of room A2 again forwards the received information towards its next immediate neighbour present in the next room A1 in the same manner which is in one single hop.

A XenGraft embedded electrical plug 102 located in room A1 in F1 receives the information coming from room A2. In other words the CPUs of the individual XenGrafts embedded inside the electrical plug 102 located in rooms A3, A2, and A1 by working as a relay node, relays the information from one room to another in hop-by-hop. The XenGraft embedded electrical plug 102 located in room A1 in F1 forwards the received information again in one single hop towards its next immediate neighbour residing in room A1 of Floor 2 (F2). This room contains a XenGraft embedded electrical plug 102 inserted into an electrical socket 412. It may be noted that the entire Second Floor has Wi-Fi connectivity.

Now as the entire Floor 2 (F2) has local Wi-Fi network present, the XenGraft embedded inside the electrical plug 102 residing in A1 of F2 activates its Wi-Fi interface and forwards all the received information accessing the local Wi-Fi network directly towards a Wi-Fi Access Point 416 present in room A3. This room holds a system server 418. The Wi-Fi Access Point 416 forwards all the received information towards the system server 418. In this manner the hospital administrator maintaining this system server 418 can easily track the identity, the location and other information about the medical instrument 404 situated at room A3 in F1.

Figure 5:
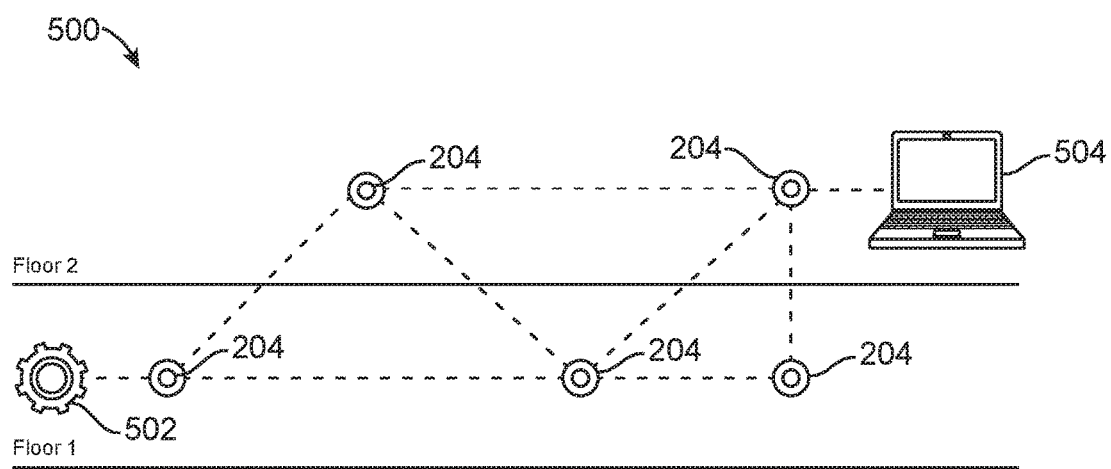
FIG. 5 depicts an illustrative representation of a possible multidirectional operational scenario where one XenGraft is relaying information towards a remote system server in a mesh networking fashion.

FIG. 5 depicts an illustrative representation of a possible multidirectional operational scenario where one XenGraft is relaying information towards a remote system server in a mesh networking fashion.

A plurality of XenGraft 204 is distributed amongst Floor 1 and Floor 2 in an environment. An instrument 502 is connected to its nearest XenGraft 204. The nearest XenGraft 204 to the instrument 502 is capable to relay information to its immediate neighbours' using a multidirectional relay based approach. In this manner the information coming from the equipment 502 which is located in Floor 1 can smoothly reach a remote system server 504 which is located in Floor 2. In this relay based approach is one XenGraft 204 is capable to transmit the information it receives to its next immediate neighbour XenGraft 204 in a hop-by-hop manner even if there is no local Wi-Fi network present. In situations like this when there is no local Wi-Fi network present in close proximity, the CPU element present inside the XenGraft 204 starts to function as the relay node and relays the information to its next immediate neighbour which in turn relays the information to its next immediate neighbour.

Figure 6:
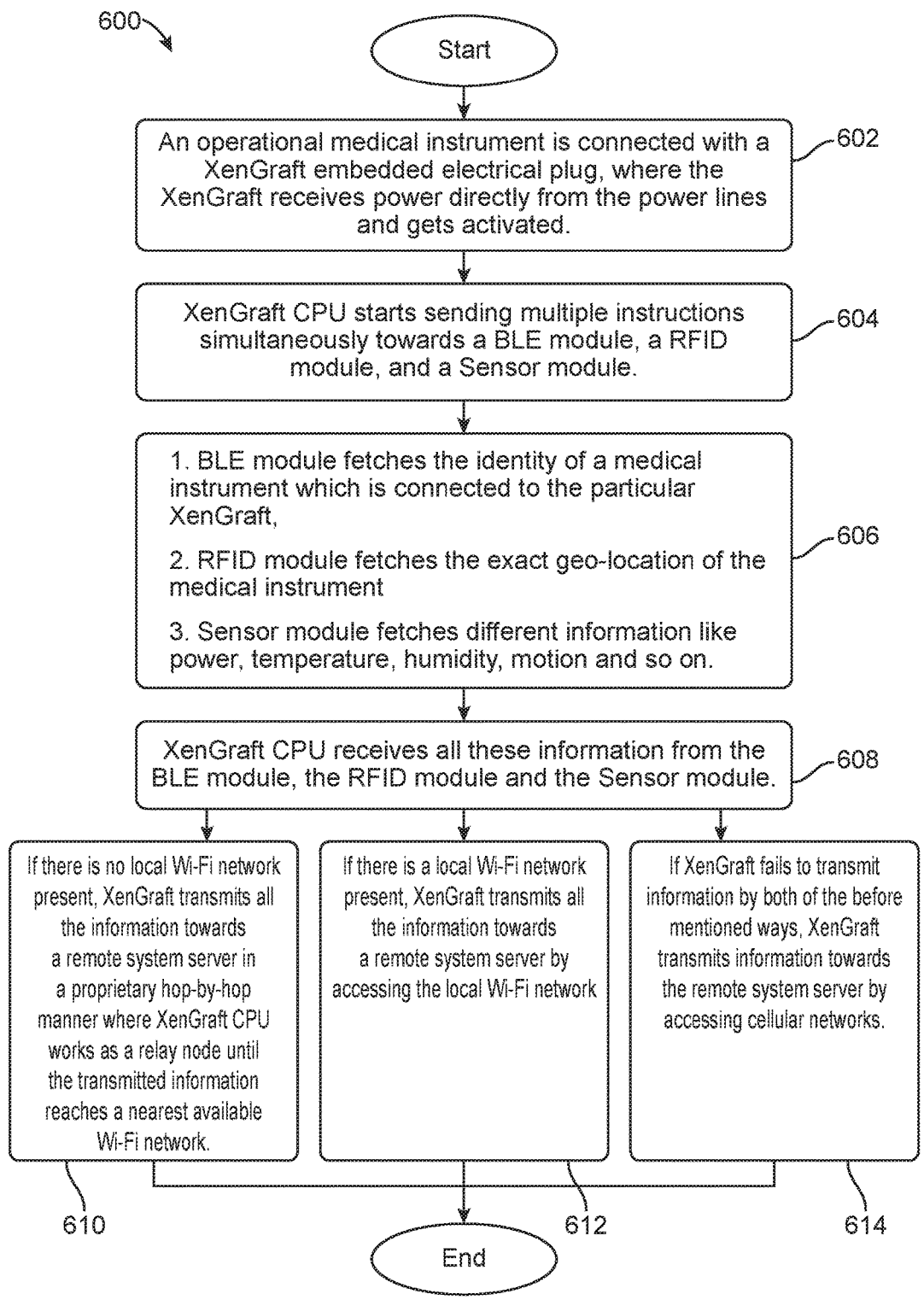
FIG. 6 depicts a flowchart when an operational medical instrument is connected to a XenGraft embedded electrical plug, wherein the electrical plug is inserted into an electrical socket from which the XenGraft is accessing power, wherein the XenGraft embedded electrical plug forwards information towards a remote system server.

FIG. 6 depicts a flowchart when an operational medical instrument is connected to a XenGraft embedded electrical plug, wherein the electrical plug is inserted into an electrical socket from which the XenGraft is accessing power, wherein the XenGraft embedded electrical plug forwards information towards a remote system server.

At step 602, an operational medical instrument is connected with a XenGraft embedded electrical plug, where the XenGraft receives power directly from the power lines and gets activated.

At step 604, XenGraft CPU starts sending multiple instructions simultaneously towards a BLE module, a RFID module, and a Sensor module.

At step 606, BLE module fetches the identity of a medical instrument which is connected to the particular XenGraft, RFID module fetches the exact geo-location of the medical instrument and the Sensor module fetches different information like power, temperature, humidity, motion and so on.

At step 608, the XenGraft CPU receives all these information from the BLE module, the RFID module and the Sensor module.

At step 610, if there is no local Wi-Fi network present, XenGraft transmits all the information towards a remote system server in a proprietary hop-by-hop manner during which the XenGraft CPU works as a relay node, until the transmitted information reaches the nearest available Wi-Fi network.

At step 612, if there is a local Wi-Fi network present then XenGraft transmits all the information towards the remote system server by accessing the local Wi-Fi network.

At step 614, if XenGraft fails to transmit information by both of the above mentioned ways, only then XenGraft transmits information towards the remote system server by accessing a cellular network.

Figure 7:
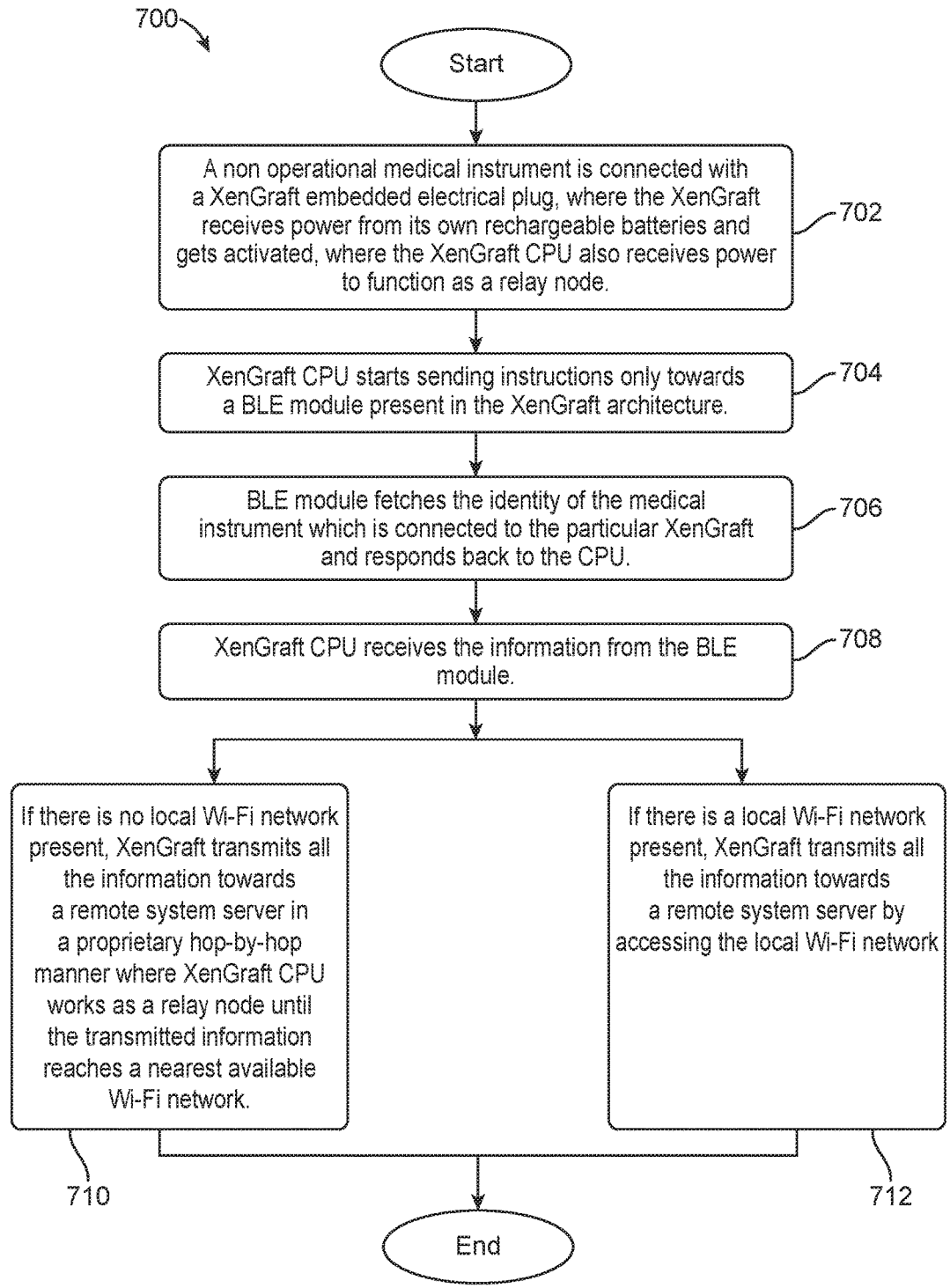
FIG. 7 depicts a flowchart when a non operational medical instrument is connected to a XenGraft embedded electrical plug, wherein the XenGraft is accessing power from its internal rechargeable batteries, wherein the XenGraft embedded electrical plug forwards information towards a remote system server.

FIG. 7 depicts a flowchart when a non operational medical instrument is connected to a XenGraft embedded electrical plug, wherein the XenGraft is accessing power from its internal rechargeable batteries, wherein the XenGraft embedded electrical plug forwards information towards a remote system server.

At step 702, a non operational medical instrument is connected with a XenGraft embedded electrical plug, where the XenGraft receives power from its own rechargeable batteries and gets activated, where the XenGraft CPU also receives power to function as a relay node.

At step 704, XenGraft CPU starts sending instructions only towards a BLE module present in the XenGraft architecture.

At step 706, the BLE module fetches the identity of the medical instrument which is connected to the particular XenGraft and responds back to the CPU.

At step 708, the XenGraft CPU receives the information from the BLE module.

At step 710, if there is no local Wi-Fi network present, XenGraft transmits all the information towards a remote system server in a proprietary hop-by-hop manner during which the XenGraft CPU works as a relay node until the transmitted information reaches a nearest available Wi-Fi network.

At step 712, if there is a local Wi-Fi network present then XenGraft transmits all the information towards the remote system server by accessing the local Wi-Fi network.

The present invention, in various embodiments, configurations, and aspects, includes components, methods, processes, systems and/or apparatus as depicted and described herein, including various embodiments, sub-combinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. The foregoing is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects of the present invention may be combined in alternate embodiments, configurations, or aspects other than those discussed above. This method of disclosure is not to be interpreted as reflecting an intention that the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. An integrated asset tracking system to track assets remotely, the asset tracking system comprising:
   at least an electrical plug embedded with a smart asset tracking device, wherein the at least an electrical plug is inserted into an electrical socket attached with a radio frequency identification (RFID) tag;
   at least one asset physically connected via an electrical wire with the at least an electrical plug, wherein the at least an electrical plug is inserted into the electrical socket attached with the RFID tag; and
   at least one remote system server wirelessly communicating with the smart asset tracking device,
   wherein the smart asset tracking device embedded inside the at least an electrical plug is referred to as an XenGraft, and further wherein the XenGraft includes a Bluetooth low energy (BLE) module, and
   wherein the BLE module provides identity information about the at least one asset physically connected via the electrical wire with the at least an electrical plug embedded with the XenGraft, wherein the XenGraft forwards the identity information towards the at least one remote system server.

2. The asset tracking system of claim 1, wherein the RFID tag is preloaded with geo-location related information about the electrical socket.

3. The asset tracking system of claim 1, wherein the at least one remote system server communicates with the smart asset tracking device via at least one local Wi-Fi network, or one proprietary hop-by-hop network, or one traditional cellular communications network, or a combination thereof.

4. The asset tracking system of claim 1, wherein the at least one asset is one medical related asset, one manufacturing related asset, or one music related asset.

5. The asset tracking system of claim 1, wherein the XenGraft comprises a RFID module or a sensor module.

6. The asset tracking system of claim 5, wherein the RFID module provides geo-location related information about the at least one asset physically connected via the electrical wire with the at least an electrical plug embedded with the XenGraft, wherein the RFID module receives the geo-location related information from the RFID tag attached with the electrical socket, wherein the XenGraft forwards the geo-location related information towards the at least one remote system server.

7. The asset tracking system of claim 5, wherein the sensor module senses a plurality of information about the XenGraft, wherein the plurality of information is power information, temperature information, humidity information, or motion detection information, wherein the XenGraft forwards the plurality of information towards the at least one remote system server.

8. The asset tracking system of claim 1, wherein the XenGraft comprises one computer processing unit (CPU) configured to function as a relay-node to forward information towards the at least one remote system server.

9. A method to track at least one operational asset remotely, the method comprising:
   plugging the at least one operational asset into at least an electrical plug embedded with one smart asset tracking device, wherein the at least an electrical plug is inserted into an electrical socket attached with one radio frequency identification (RFID) tag, wherein the one smart asset tracking device consumes power from the electrical power lines;
   transmitting at least one command by one computer processing unit (CPU) towards a Bluetooth low energy (BLE) module, a RFID module, and a sensor module, wherein the CPU, the BLE module, the RFID module, and the sensor module are all embedded inside the smart asset tracking device;
   providing, by the BLE module, identity information about the operational asset plugged into the at least an electrical plug embedded with the one smart asset tracking device, wherein the one smart asset tracking device forwards the received identity information towards a remote system server;
   providing, by the RFID module, geo-location information about the operational asset plugged into the at least an electrical plug embedded with the one smart asset tracking device, wherein the one smart asset tracking device forwards the geo-location information about the operational asset towards the remote system server;
   providing, by the sensor module, information about the operational asset plugged into the at least an electrical plug embedded with the one smart asset tracking device, wherein the one smart asset tracking device forwards the information about the operational asset towards the remote system server;
   receiving, by the remote system server, a plurality of information coming from the at least an electrical plug embedded with the one smart asset tracking device; and
   processing, by the remote system server, the plurality of information received from the at least an electrical plug embedded with the one smart asset tracking device to generate a plurality of information associated with the one operational asset plugged into the at least an electrical plug.

10. The method of claim 9, wherein the one smart asset tracking device embedded inside the at least an electrical plug is called an XenGraft.

11. The method of claim 9, wherein the RFID tag is preloaded with the geo-location related information about the electrical socket.

12. The method of claim 9, wherein the at least one remote system server communicates with the smart asset tracking device via at least one local Wi-Fi network, or one proprietary hop-by-hop network, or one traditional cellular communications network, or a combination thereof.

13. The method of claim 9, wherein the at least one operational asset is one medical related asset, one manufacturing related asset, or one music related asset.

14. The method of claim 9, wherein the CPU is configured to function as a relay-node to forward information towards the at least one remote system server.

15. A method to track at least one non-operational asset remotely, the method comprising:
   plugging the at least one non-operational asset into at least an electrical plug embedded with one smart asset tracking device, wherein the at least an electrical plug is inserted into an electrical socket attached with one radio frequency identification (RFID) tag, wherein the one smart asset tracking device consumes power from at least one internal rechargeable battery located inside the one smart asset tracking device;
   transmitting at least one command by one computer processing unit (CPU) towards a Bluetooth low energy (BLE) module, wherein the CPU and the BLE module are embedded inside the smart asset tracking device;
   providing, by the BLE module, identity information about the non-operational asset plugged into the at least an electrical plug embedded with the one smart asset tracking device, wherein the one smart asset tracking device forwards the received identity information towards a remote system server;

receiving, by the remote system server, the identity information coming from the at least an electrical plug embedded with the one smart asset tracking device; and processing, by the remote system server, the identity information received from the at least an electrical plug embedded with the one smart asset tracking device to generate a plurality of information associated with the one non-operational asset plugged into the at least one electrical plug.

16. The method of claim 15, wherein the one smart asset tracking device embedded inside the at least one electrical plug is called an XenGraft.

17. The method of claim 15, wherein the at least one remote system server communicates with the smart asset tracking device via at least one local Wi-Fi network, or one proprietary hop-by-hop network, or a combination thereof.

18. The method of claim 15, wherein the at least one non-operational asset is one medical related asset, one manufacturing related asset, or one music related asset.

19. The method of claim 15, wherein the CPU is configured to function as a relay-node to forward information towards the at least one remote system server.

20. The method of claim 15, wherein the at least one internal rechargeable battery located inside the one smart asset tracking device is capable to function for 20 days on its own without requiring any recharging.

* * * * *